United States Patent [19]
Awada et al.

[11] Patent Number: 5,584,420
[45] Date of Patent: Dec. 17, 1996

[54] REUSABLE AND ACCURATELY PRE-MEASURED LIQUID DISPENSER

[76] Inventors: Hassan Awada; Keri Awada, both of 2093 Wrenwood Ave., Clovis, Calif. 93611-7409

[21] Appl. No.: 412,548

[22] Filed: Mar. 29, 1995

[51] Int. Cl.⁶ ..................................................... B67D 5/06
[52] U.S. Cl. .................... 222/153.09; 222/205; 222/448; 222/456; 222/525
[58] Field of Search ............................... 222/153.09, 158, 222/205, 207, 448, 456, 522, 523, 524, 525

[56] References Cited

U.S. PATENT DOCUMENTS

| | | | |
|---|---|---|---|
| 673,532 | 5/1901 | Brake | 222/205 X |
| 2,730,270 | 1/1956 | Heinemann | 222/205 |
| 3,094,250 | 6/1963 | Molyneaux | 222/207 |
| 3,141,579 | 7/1964 | Medlock | 222/207 |
| 3,628,700 | 12/1971 | Donoghue . | |
| 4,105,142 | 8/1978 | Morris, Jr. | 222/158 |
| 4,211,346 | 7/1980 | Mehra et al. | 222/205 |
| 4,473,097 | 9/1984 | Knickerbocker et al. | 222/158 X |
| 4,747,521 | 5/1988 | Saffron | 222/205 |
| 4,813,577 | 3/1989 | Carow | 222/525 X |
| 4,830,226 | 5/1989 | Kong | 222/207 X |
| 4,927,065 | 5/1990 | Beck | 222/525 X |
| 5,067,638 | 11/1991 | Bavaveas | 222/205 |
| 5,127,553 | 7/1992 | Weinstein | 222/158 |
| 5,169,033 | 12/1992 | Shay | 222/153.09 |
| 5,330,081 | 7/1994 | Davenport | 222/205 |
| 5,474,209 | 12/1995 | Vallet Mas et al. | 222/153.09 X |

*Primary Examiner*—Joseph Kaufman
*Attorney, Agent, or Firm*—Hinkle & Associates, P.C.

[57] ABSTRACT

A liquid dispenser that is suitable for metering pre-measured quantities of liquid from a rigid wall or deformable walled container. The liquid dispenser comprises a nozzle (16) which attaches to the container at one end and attaches to a dispensing chamber (14) at the other end. The dispensing chamber (14) has an opening (24) at its inlet end which juxtaposes with a disk (21) at the discharge end of the nozzle. The nozzle (16) has a central aperture (19) which terminates at the discharge end with inwardly projecting arms (22) which support the disk (21). The seating of the chamber on the end of the nozzle brings the disk (21) into juxtaposition with the opening (24) to control the flow of liquid from the container to the dispensing chamber (14). When the dispensing chamber (14) is fully engaged with the discharge end of the nozzle (16), the opening (24) in the dispensing chamber interlocks with the disk (21) on the nozzle to prevent the liquid from entering the dispensing chamber. When the dispensing chamber (14) is retracted from the nozzle (16) and the container is inverted, the liquid passes from the central aperture (19) around the disk (21) and into the dispensing chamber (14). Once the dispensing chamber (14) is filled, the chamber is pushed down onto the nozzle (16) so that the disk (21) engages with the opening (24) which stops the flow of liquid. At this point the container holds a pre-measured charge of liquid which may be stored for later use or dispensed immediately by removing the outer cap (15) from the dispensing chamber (14).

1 Claim, 2 Drawing Sheets

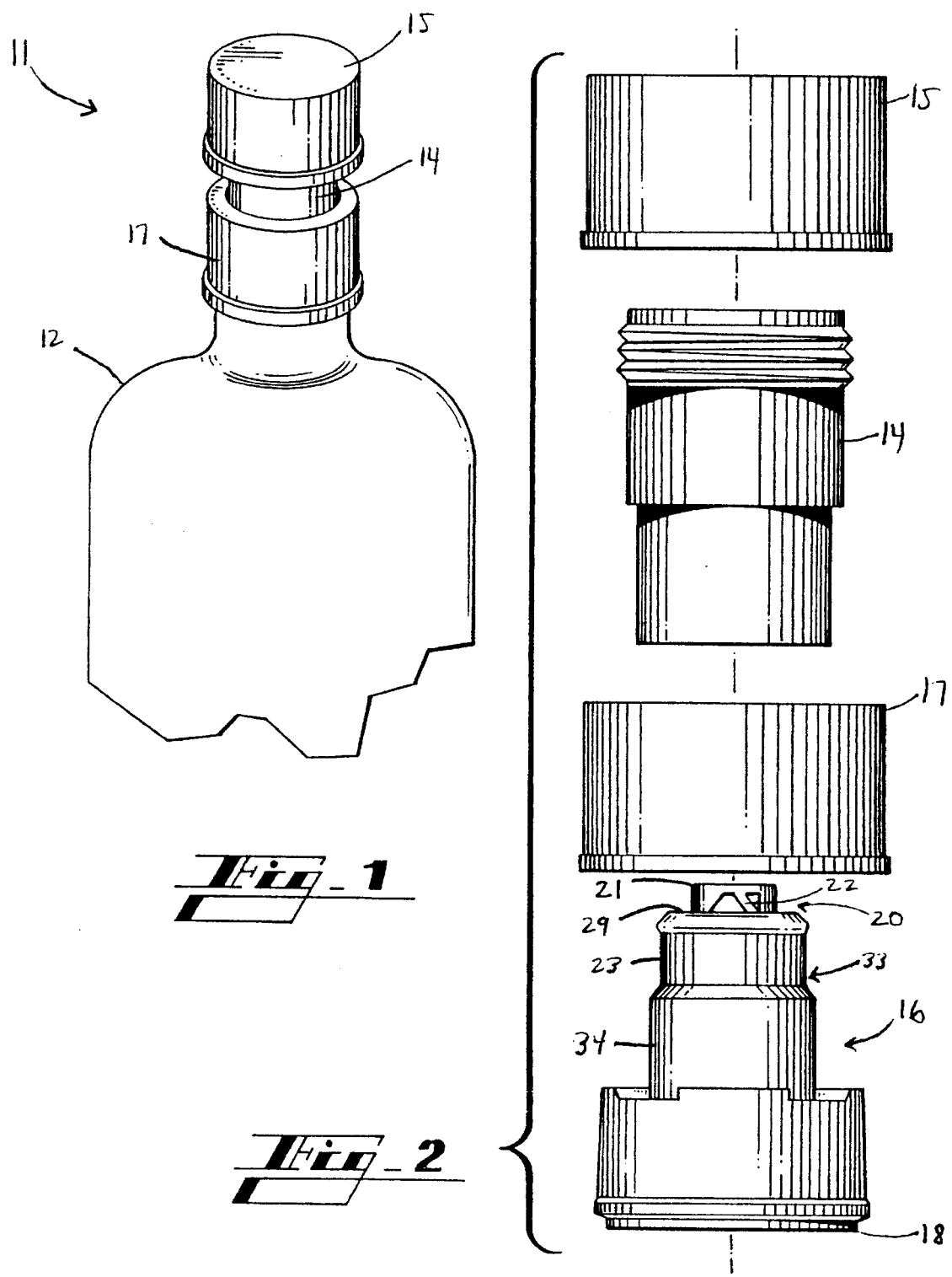

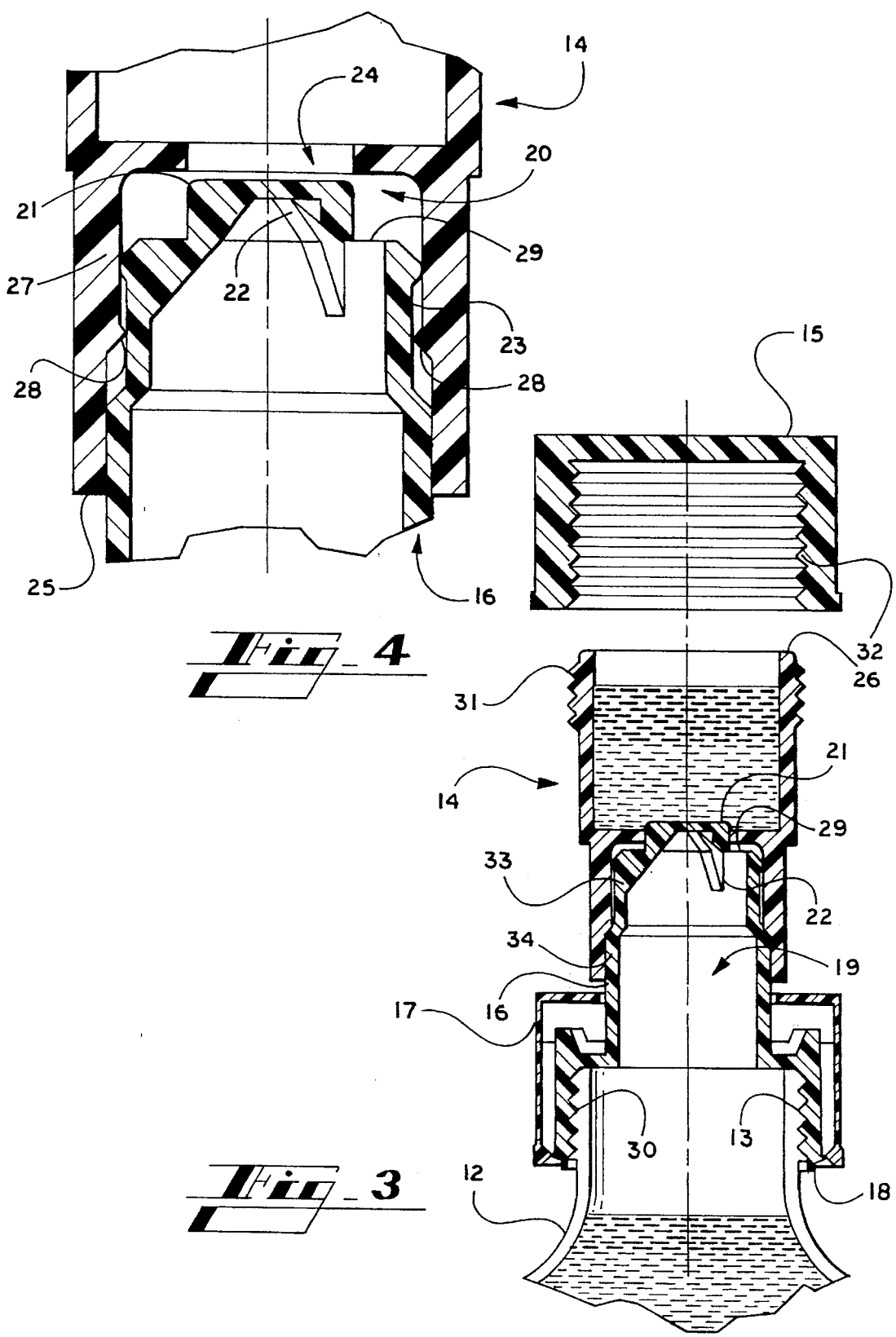

REUSABLE AND ACCURATELY PRE-MEASURED LIQUID DISPENSER

BACKGROUND OF THE INVENTION

I. Field of the Invention

The present invention relates to a liquid measuring dispenser for dispensing a pre-measured amount of liquid.

II. Description of the Related Art

There are many instances in which it is desired to dispense an accurately measured amount of liquid from a bottle. One area where this need is prevalent is in the medical field. A measuring dispenser is commonly used to measure quantities of liquid poured from a medication bottle. The stand alone measuring dispenser is not a completely satisfactory device for measuring liquids. Being a separate unit, the dispenser can be misplaced. Also, the dispenser is prone to overfilling, underfilling, and spills. Further, the separate dispenser requires the medicine bottle to be opened which creates a potential for contamination of the medicine. As a result of these drawbacks, it has been a common goal in the art to invent a self-contained metering dispenser which can be integrated with the medicine bottle.

There are several types of integral, pre-measured liquid dispensers existing in the prior art. Among the most common types of dispensers are those that have separate storage and dispensing chambers. In order for these dispensers to accomplish their goal of self contained metering of liquid, the chambers must communicate with each other. Liquid dispensers are commonly constructed of either rigid or deformable walls. Usually the deformable walled dispensers have a conduit tube through which the liquid, which is pressurized by the deformation of the walls of the dispenser, flows into the dispensing chamber. An alternative to the pressurized flow of a deformable dispenser is the inversion type dispenser which relies on the force of gravity to transport the liquid from the storage chamber to the dispensing chamber. The present invention concerns the inversion type dispensers and may be constructed with rigid or deformable walls.

U.S. Pat. No. 3,141,579 discloses a liquid measuring dispenser that utilizes separate storage and dispensing chambers and may be constructed of rigid or deformable walls. In the embodiment with deformable walls, the liquid measuring dispenser has a storage chamber and a metering chamber which are divided by a necked down portion of the dispenser. A spring biased plunger fills the opening in the necked down portion between the two chambers and prevents liquid from entering the metering chamber from the storage chamber. When the sides of the dispenser are squeezed, the liquid in the storage chamber forces the plunger to retract which allows the liquid to pass into the metering chamber. Once the metering chamber is filled, the plunger shuts off the flow of liquid from the storage chamber. The resulting measured liquid can be held in the metering chamber or dispensed through a spout at the top of the dispenser.

The same patent also discloses a rigid walled device which operates under similar principles. The device has a double acting plunger which is biased by means of a spring. The outlet of the metering chamber is closed by one end of the plunger, and the other end of the plunger closes off the orifice between the storage chamber and the metering chamber. In its biased position, the outlet of the measuring chamber is closed by the end of the plunger being seated in the outlet orifice, and the orifice between the storage chamber and the measuring chamber is opened by the other end of the plunger being retracted. Thus, in the biased position, inversion of the dispenser allows liquid to pass into the measuring compartment. When an actuating button is depressed with the dispenser in the inverted position, the double acting plunger will be moved along the inside of the dispenser such that the first plunger will open the outlet of the measuring compartment and the second plunger will close off the orifice between the storage chamber and the metering chamber. In order to allow for smooth flow of the liquid from the exit portion of the dispenser, the exit spout is equipped with an air valve.

While the prior art device accomplishes the goal of self contained metering of liquids, the present invention accomplishes the goal with a device that is easier to use, easier to manufacture, and more reliable due to its simpler construction.

SUMMARY OF THE INVENTION

The present invention concerns a liquid dispenser for dispensing pre-measured quantities of liquid. The liquid dispenser has a nozzle with an inlet end and an outlet end. The nozzle attaches at the inlet end to a bottle. At the outlet end, the nozzle engages with a tubular dispensing chamber. The nozzle has a central aperture which terminates at the discharge end with inwardly projecting arms supporting a disk. The disk is raised above the surface of the discharge end to form a round seating around the disk. Also, the nozzle has a groove on its exterior for engaging with the tubular dispensing chamber.

The upper portion of the tubular dispensing chamber holds a pre-measured amount of liquid, and the lower portion of the tubular dispensing chamber engages with the nozzle. The outlet located at the top of the chamber connects with a removable outer cap which creates a liquid tight seal. After the liquid is transferred from the bottle to the tubular dispensing chamber through the nozzle, the outer cap is removed in order to dispense the measured amount of liquid. The tubular dispensing chamber is attached to and slidably engages with the exterior of the nozzle. The tubular dispensing chamber has a round opening located between its outlet and inlet end. When the tubular dispensing chamber is pushed down along the length of the nozzle, the round opening cooperatively juxtaposes with the disk at the discharge end of the nozzle. In this closed position, the portion of the tubular dispensing chamber which borders the round opening at the inlet to the tubular dispensing chamber is seated on the nozzle around the disk, and the disk and the round opening interlock to form a liquid tight seal.

In the open position, the round opening is positioned above the disk and the liquid can flow around the edges of the disk from the aperture in the nozzle. Thus, if the dispenser is inverted in the open position, the liquid will flow into the tubular dispensing chamber from the bottle.

Between the round opening in the tubular dispensing chamber and the inlet end of the tubular dispensing chamber, the chamber has an annular boss on its inside surface. The annular boss travels in the groove on the outside of the nozzle to allow for adjustment from the open to the closed position and to prevent the tubular dispensing chamber from completely disengaging from the nozzle.

Other objects, advantages and capabilities of the invention will become apparent from the following description taken in conjunction with the accompanying drawings showing preferred embodiments of the invention.

BRIEF DESCRIPTION OF THE DRAWINGS

FIG. 1 is a perspective view of the liquid dispenser attached to a bottle;

FIG. 2 is an exploded elevation view of the present invention;

FIG. 3 is a sectional elevation view of the present invention attached to a bottle; and FIG. 4 is a detailed sectional elevation view of the nozzle and tubular dispensing chamber of the present invention.

DESCRIPTION OF THE PREFERRED EMBODIMENTS

Referring to the drawings wherein like reference numerals designate corresponding parts throughout the several figures, and initially referring to FIG. 1 showing a perspective view of the present invention, the invention comprises a pre-measured liquid dispensing device 11 which attaches to a bottle 12. All of the components of the pre-measured liquid dispensing device are preferably constructed of molded plastic. The pre-measured liquid dispensing device 11 is shown in its closed position. As an option when the device is used for dispensing medicine, the nozzle 16 may be equipped with a standard child safety cap 17 which prevents the nozzle from being removed from the bottle.

Referring to FIGS. 2 and 3, the nozzle 16 may have a set of screw threads 13 at its inlet end 18 for engaging with standard screw threads 30 on the end of a bottle. The safety cap 17 fits over the sides of the nozzle 16 and prevents the nozzle from being unscrewed from the bottle 12. The nozzle 16 has a central aperture 19 which necks down from a diameter approximately equal to the diameter of the bottle at the inlet end 18 to a smaller diameter at the discharge end 20. The central aperture 19 is partially obstructed by a disk 21 at the discharge end 20. The disk 21 is positioned in the middle of the aperture and supported by inwardly projecting arms 22 which attach the disk 21 to the discharge end 20 of the nozzle. The disk 21 extends above the discharge end 20 of the nozzle and the result is a seat 29 created around the disk by the difference in heights between the disk 21 and the discharge end 20 of the nozzle. The nozzle also has a groove 23 around its circumference which allows the tubular dispensing chamber 14 to engage with the nozzle. The exterior surface of the nozzle may be tapered inward between the inlet end 18 and the discharge end 20. The taper forms a stepped down portion 33 of the nozzle with a smaller diameter than a remaining portion 34.

Referring to FIGS. 3 and 4, the flow of liquid from the bottle to the tubular dispensing chamber is stopped by lowering the tubular dispensing chamber until the chamber is positioned on the seat 29 and the tubular dispensing chamber is interlocked with the disk 21. In this closed position, the disk 21 makes a liquid tight seal with the inside diameter of the round opening 24 of the tubular dispensing chamber. The outlet end 26 of the tubular dispensing chamber may have a set of screw threads 31 in order to engage with the screw threads 32 inside the outer cap 15.

The tubular dispensing chamber extends both above and below the round opening 24. The portion of the tubular dispensing chamber, which extends above the opening 24, forms the container for holding a pre-measured charge of liquid. The portion of the tubular dispensing chamber, which extends below the opening 24, engages with the nozzle and prevents the spilling of liquid when the liquid flows from the bottle to the tubular dispensing chamber. The inside surface 27 of the tubular dispensing chamber 14 below the opening 24 has an annular boss 28 which travels in the groove 23 of the nozzle 16. As the tubular dispensing chamber 14 is raised and lowered on the nozzle, the annular boss 28 travels from one end to the other end of the groove 23 on the nozzle. When the tubular dispensing chamber 14 is raised to allow liquid to flow, the annular boss makes a liquid tight seal with the top of the groove 23, and the top of the groove 23 prevents the tubular dispensing chamber 14 from being removed completely from the nozzle. When the tubular dispensing chamber is lowered onto the seat 29, the seat 29 prevents the tubular dispensing chamber from moving any further and the disk 21 and the opening 24 make a liquid tight seal.

In order to allow liquid to flow from the bottle through the nozzle to the tubular dispensing chamber 14, the tubular dispensing chamber is raised so that the inlet 24 of the tubular dispensing chamber is no longer closed off by the disk 21. Once the tubular dispensing chamber is raised, the liquid can flow out of the central aperture 19 of the nozzle and around the disk 21 into the tubular dispensing chamber 14.

The sequence of operation for the present invention begins with the tubular dispensing chamber 14 being empty and resting in the seat 20 formed by the disk 21 and the discharge end 20 of the nozzle. In this position the disk 21 is interlocked with the opening 24 in the tubular dispensing chamber 14 to prevent the flow of liquid from the bottle 12 to the chamber 14. In order to allow liquid to pass from the bottle to the tubular dispensing chamber 14, the tubular dispensing chamber is retracted from the nozzle in the upward direction. As the chamber is moved upward, the opening 24 moves away from the disk 21 and the liquid can pass from the nozzle 16 into the chamber 14. The annular boss 28 in the inside of the tubular dispensing chamber travels upward in the groove 23 on the outside of the nozzle. The end of the groove 23 prevents the tubular dispensing chamber 14 from being removed completely from the nozzle 16 and forms a liquid tight seal. With the chamber retracted from the nozzle, the bottle 12 is inverted to allow the liquid to fill the tubular dispensing chamber 14. Once the chamber is filled, the chamber is pushed back down onto the nozzle 16 to close off the passage way for the liquid from the bottle. At this stage, the metered liquid can be stored in the tubular dispensing chamber 14 or the outer cap 15 can be removed and the pre-measured quantity of liquid can be dispensed.

Various modifications may be made of the invention without departing from the scope thereof and it is desired, therefore, that only such limitations shall be placed thereon as are imposed by the prior art and which are set forth in the appended claims.

What is claimed is:

1. A liquid dispenser, the liquid dispenser attaching to a bottle, the liquid dispenser comprising:

a nozzle having an inlet end, a discharge end, an exterior surface, and a central aperture, the central aperture terminating at the discharge end of the nozzle with inwardly projecting arms supporting a disk, the discharge end of the nozzle forming a seat surrounding the disk, the exterior surface of the nozzle having a groove, the inlet end of the nozzle connected to the bottle;

the inlet end of the nozzle having screw threads which engage with a set of standard screw threads on the bottle;

the nozzle being cylindrical, the exterior surface of the nozzle tapering inward between the inlet end and the outlet end of the nozzle to form a stepped down portion, the stepped down portion of the nozzle having a smaller diameter than a remaining portion of the nozzle;

a tubular dispensing chamber having an inlet end, an outlet end, and an inside surface, the inside surface of the dispensing chamber engaging with the exterior surface of the nozzle, the dispensing chamber having an opening between the inlet end and the outlet end which interlocks with the disk on the discharge end of the nozzle, the dispensing chamber resting on the seat surrounding the disk when the opening and the disk are interlocked, the inside surface of the dispensing chamber having an annular boss positioned between the opening and the inlet end, the annular boss traveling in the groove on the exterior surface of the nozzle;

an outlet cap connected to the outlet end of the tubular dispensing chamber;

a child-proof safety cap having an opening through a center portion of the cap, the opening in the cap surrounding the nozzle, the safety cap attaching to the inlet end of the nozzle, the safety cap rotating independently of the nozzle to prevent the nozzle from being removed from the bottle; and the outlet end of the dispensing chamber having a set of screw threads, the inside of the outlet cap having screw threads to engage with the set of threads on the outlet end of the dispensing chamber.

* * * * *